(12) United States Patent
Wittorf et al.

(10) Patent No.: US 8,878,047 B2
(45) Date of Patent: Nov. 4, 2014

(54) HEAT ENGINE SYSTEM FOR VEHICLES

(75) Inventors: Marten Wittorf, Ingelheim (DE); Alan L. Browne, Grosse Pointe, MI (US); Nancy L. Johnson, Northville, MI (US); James Holbrook Brown, Costa Mesa, CA (US)

(73) Assignees: GM Global Technology Operations LLC, Detroit, MI (US); Dynalloy, Inc., Tustin, CA (US)

( * ) Notice: Subject to any disclaimer, the term of this patent is extended or adjusted under 35 U.S.C. 154(b) by 281 days.

(21) Appl. No.: 13/427,107

(22) Filed: Mar. 22, 2012

(65) Prior Publication Data

US 2013/0247950 A1  Sep. 26, 2013

(51) Int. Cl.
*H01L 35/30* (2006.01)
*B60K 16/00* (2006.01)
*F03G 7/06* (2006.01)

(52) U.S. Cl.
CPC ................ *B60K 16/00* (2013.01); *F03G 7/065* (2013.01)
USPC .......................... 136/205; 60/641.6; 180/165

(58) Field of Classification Search
CPC ........... B60K 16/00; F03G 6/045; F03G 7/00; F03G 7/065
USPC ........................ 180/165; 60/641.6; 136/205
See application file for complete search history.

(56) References Cited

U.S. PATENT DOCUMENTS

| | | | |
|---|---|---|---|
| 4,055,955 A | | 11/1977 | Johnson |
| 4,246,754 A | * | 1/1981 | Wayman ........................ 60/527 |
| 5,031,711 A | * | 7/1991 | Tanaka et al. .................. 180/7.1 |
| 5,172,784 A | * | 12/1992 | Varela, Jr. ................ 180/65.245 |
| 5,327,987 A | | 7/1994 | Abdelmalek |
| 6,831,221 B2 | * | 12/2004 | Hulen ............................ 136/253 |
| 7,444,812 B2 | * | 11/2008 | Kirkpatirck et al. ............ 60/528 |
| 7,493,974 B1 | * | 2/2009 | Boncodin ...................... 180/2.2 |
| 7,718,887 B2 | * | 5/2010 | Hulen ........................... 136/206 |
| 8,220,569 B2 | * | 7/2012 | Hassan ........................ 180/2.2 |
| 8,511,082 B2 | * | 8/2013 | Browne et al. .................. 60/527 |
| 8,534,064 B2 | * | 9/2013 | Browne et al. .................. 60/527 |
| 8,607,562 B2 | * | 12/2013 | Browne et al. .................. 60/527 |
| 8,631,652 B2 | * | 1/2014 | Alexander et al. ............. 60/527 |
| 2009/0090573 A1 | * | 4/2009 | Boone ...................... 180/65.245 |
| 2011/0120116 A1 | * | 5/2011 | Alexander et al. ............. 60/527 |

FOREIGN PATENT DOCUMENTS

DE  10330574 A1  6/2004
DE  102010020214 A1  11/2011

* cited by examiner

*Primary Examiner* — John Walters
*Assistant Examiner* — Brian Swenson
(74) *Attorney, Agent, or Firm* — Quinn Law Group, PLLC

(57) ABSTRACT

A heat engine system for a vehicle, wherein the vehicle is operable on a road surface, includes a collector configured for collecting an air layer disposed adjacent the road surface. The heat engine system also includes a heat engine configured for converting thermal energy provided by a temperature difference between the air layer and an ambient air surrounding the vehicle to another form of energy. The air layer has a first temperature, and the ambient air has a second temperature that is lower than the first temperature. In addition, the heat engine system includes a guide configured for transferring the air layer from the collector to the heat engine. A vehicle includes a body defining an interior compartment and having an underside surface spaced opposite the road surface, and the heat engine system.

18 Claims, 3 Drawing Sheets

HEAT ENGINE SYSTEM FOR VEHICLES

TECHNICAL FIELD

The present disclosure generally relates to heat engine systems for vehicles.

BACKGROUND

Thermal energy is a form of energy provided by a temperature difference between objects, regions, and/or fluids. For example, a first region of a system may have a comparatively higher temperature than that of a second region, and the temperature difference between the two regions may provide a source of thermal energy. Further, such thermal energy may be converted to another form of energy, e.g., mechanical energy or electrical energy.

SUMMARY

A heat engine system for a vehicle, wherein the vehicle is operable on a road surface, includes a collector configured for collecting an air layer disposed adjacent the road surface. The heat engine system also includes a heat engine configured for converting thermal energy provided by a temperature difference between the air layer and an ambient air surrounding the vehicle to another form of energy. The air layer has a first temperature, and the ambient air has a second temperature that is lower than the first temperature. Further, the heat engine system includes a guide configured for transferring the air layer from the collector to the heat engine.

In one embodiment, the heat engine includes an element formed from a shape memory alloy that is transitionable between a martensite phase and an austenite phase at a transformation temperature in response to the temperature difference. Further, the element is configured as a resilient member arranged in a continuous loop, and has a first localized region and a second localized region spaced apart from the first localized region. The shape memory alloy alternately dimensionally contracts at the first localized region in response to the first temperature, and dimensionally expands at the second localized region in response to the second temperature to thereby convert thermal energy to mechanical energy. In addition, the heat engine system also includes a spoiler reversibly deployable from an underside surface of the vehicle and configured for transitioning between a retracted position wherein the spoiler is disposed substantially flush with the underside surface, and a deployed position wherein the spoiler extends from the underside surface. The heat engine system further includes a sensor system configured for detecting debris present on the road surface, and transitioning the spoiler to the retracted position to thereby minimize contact between the debris and the spoiler.

A vehicle operable on a road surface includes a body defining an interior compartment and having an underside surface spaced opposite the road surface. The vehicle further includes the heat engine system.

The detailed description and the drawings or figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
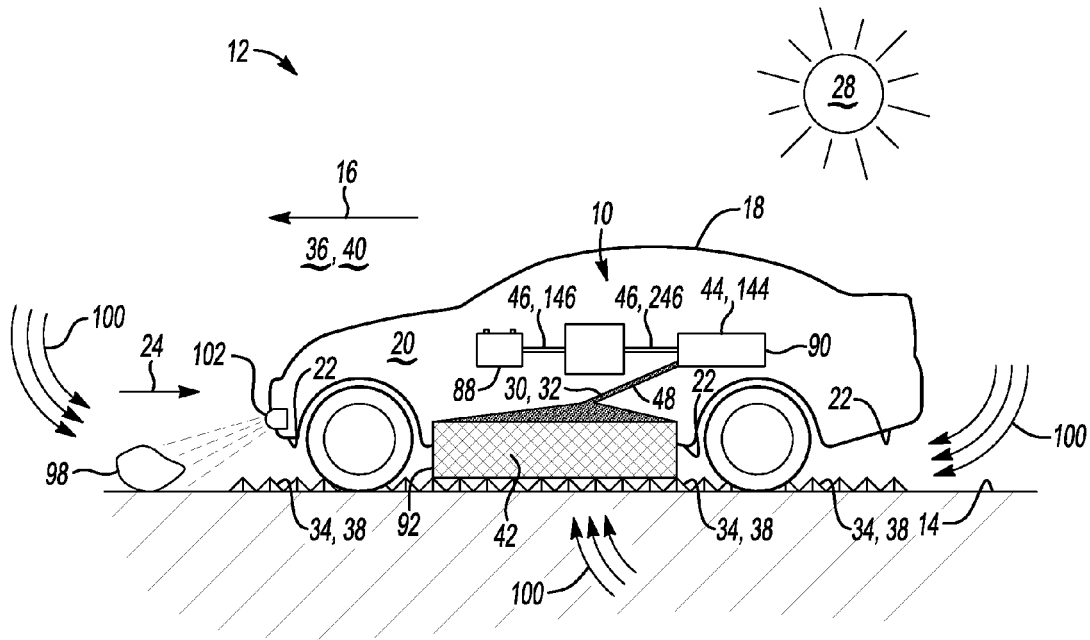
FIG. 1 is a schematic illustration of a side view of a vehicle including a heat engine system, wherein the heat engine system includes a heat engine.

Referring to the Figures, wherein like reference numerals refer to like elements, a heat engine system 10 for a vehicle 12 is shown generally in FIG. 1. The heat engine system 10 may be useful for vehicles 12 operable on a road surface 14. As such, the heat engine system 10 may be useful for automotive vehicles, such as passenger cars, sport utility vehicles, pick-up trucks, and the like. However, the heat engine system 10 may also be useful for non-automotive applications, including construction vehicles and recreational vehicles.

Directional terminology used herein pertaining to the vehicle 12 is understood by one skilled in the art. For example, terminology such as "front", "forward", and "fore" generally refers to a leading portion of the vehicle 12 with respect to a direction of vehicle travel (represented generally by arrow 16 in FIG. 1) on the road surface 14. Likewise, terminology such as "rear", "rearward", and "aft" generally refers to a trailing portion of the vehicle 12 with respect to the direction of vehicle travel 16.

As shown in FIG. 1, the vehicle 12 includes a body 18 defining an interior compartment (shown generally at 20). Therefore, components not disposed within the interior compartment 20 are generally referenced as the body 18 of the vehicle 12. Further, with continued reference to FIG. 1, the body 18 has an underside surface 22 spaced opposite the road surface 14. That is, the underside surface 22 may be referred to as an underbody or undercarriage of the vehicle 12.

As set forth above, the vehicle 12 is operable on the road surface 14. That is, the vehicle 12 may move along the road surface 14 in the direction of vehicle travel 16 (FIG. 1), or may move along the road surface 14 in a direction (represented generally by arrow 24 in FIG. 1) opposite the direction of vehicle travel 16. Alternatively, referring to FIG. 2, the vehicle 12 may be disposed in a parked position (denoted generally by 26) on the road surface 14 such that the vehicle 12 is stationary on the road surface 14 and does not move along the road surface 14.

The road surface 14 may be formed from any suitable material. Suitable road surfaces 14 may be formed from, for example, asphalt, dirt, gravel, pavement, concrete, cement, polymer, and combinations thereof. More specifically, referring to FIG. 1, the road surface 14 may be capable of absorbing solar radiation (indicated generally at 28), storing thermal energy 30, and transferring the thermal energy 30 as heat, e.g., by radiation or convection, to the vehicle 12. That is, the thermal energy 30 is provided by a temperature difference (represented generally by 32) between an air layer (represented generally at 34) disposed adjacent the road surface 14, and an ambient air (represented generally by 36) surrounding the vehicle 12.

More specifically, with continued reference to FIG. 1, the air layer 34 disposed adjacent the road surface 14 has a first temperature 38, and the ambient air 36 has a second temperature 40 that is lower than the first temperature 38. That is, the air layer 34 may be comparatively warmer than the ambient air 36 surrounding the vehicle 12. In one example, the first temperature 38 may be higher than the second temperature 40 by at least about 10° C. It is to be appreciated that, as used herein, the terminology "first temperature 38" refers to an average temperature of the air layer 34. That is, the air layer 34 may be characterized as a stratified layer of air that has an overall temperature gradient, wherein a temperature of the air layer 34 decreases with increasing distance from the road surface 14. As such, the first temperature 38 refers to the average temperature of the overall temperature gradient. Further, as used herein, the terminology ambient air 36 refers to air surrounding the vehicle 12 at any location above the underside surface 22, e.g., along the body 18, above a bumper (not shown), at a vehicle grille (not shown), etc.

With continued reference to FIG. 1, the road surface 14 may absorb solar radiation 28, and the air layer 34 may heat up at a faster rate than the ambient air 36 surrounding the vehicle 12. Therefore, thermal energy 30 provided by the temperature difference 32 may transfer between the road surface 14 and the underside surface 22 of the vehicle 12. That is, the road surface 14 may radiate and/or convect heat via the air layer 34 to the underside surface 22 of the vehicle 12.

Figure 2:
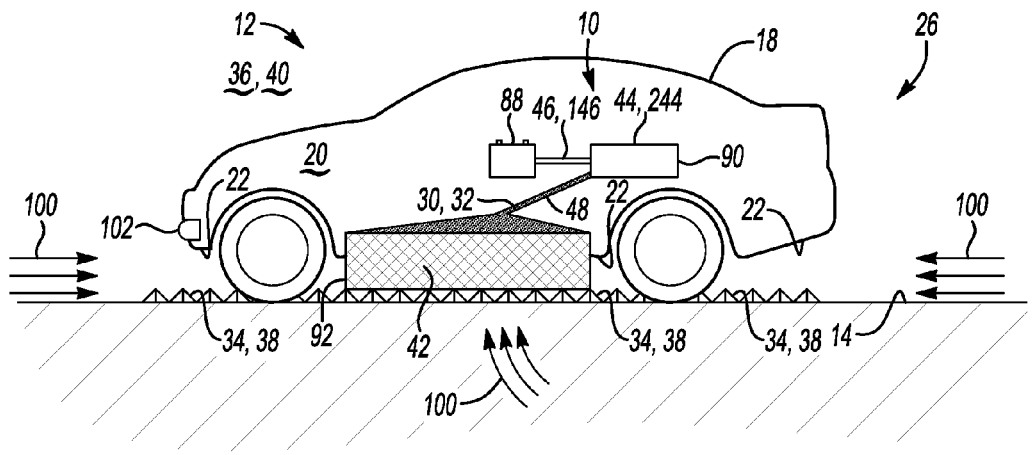
FIG. 2 is a schematic illustration of a side view of another embodiment of the heat engine system of FIG. 1.

Referring now to FIGS. 1 and 2, the heat engine system 10 includes a collector 42 configured for collecting the air layer 34. That is, the collector 42 may accumulate the air layer 34 as the vehicle 12 travels along, or is parked on, the road surface 14, and may operate as a collection point for the air layer 34. As such, the collector 42 may be disposed on the underside surface 22 of the vehicle 12 and may be spaced opposite the road surface 14. The collector 42 may include one or more air-entry zones (not shown), shutters (not shown), channels (not shown), and combinations thereof to thereby harvest the thermal energy 30 provided by the temperature difference 32 between the air layer 34 at the road surface 14 and the ambient air 36 surrounding the vehicle 12.

Figure 3:
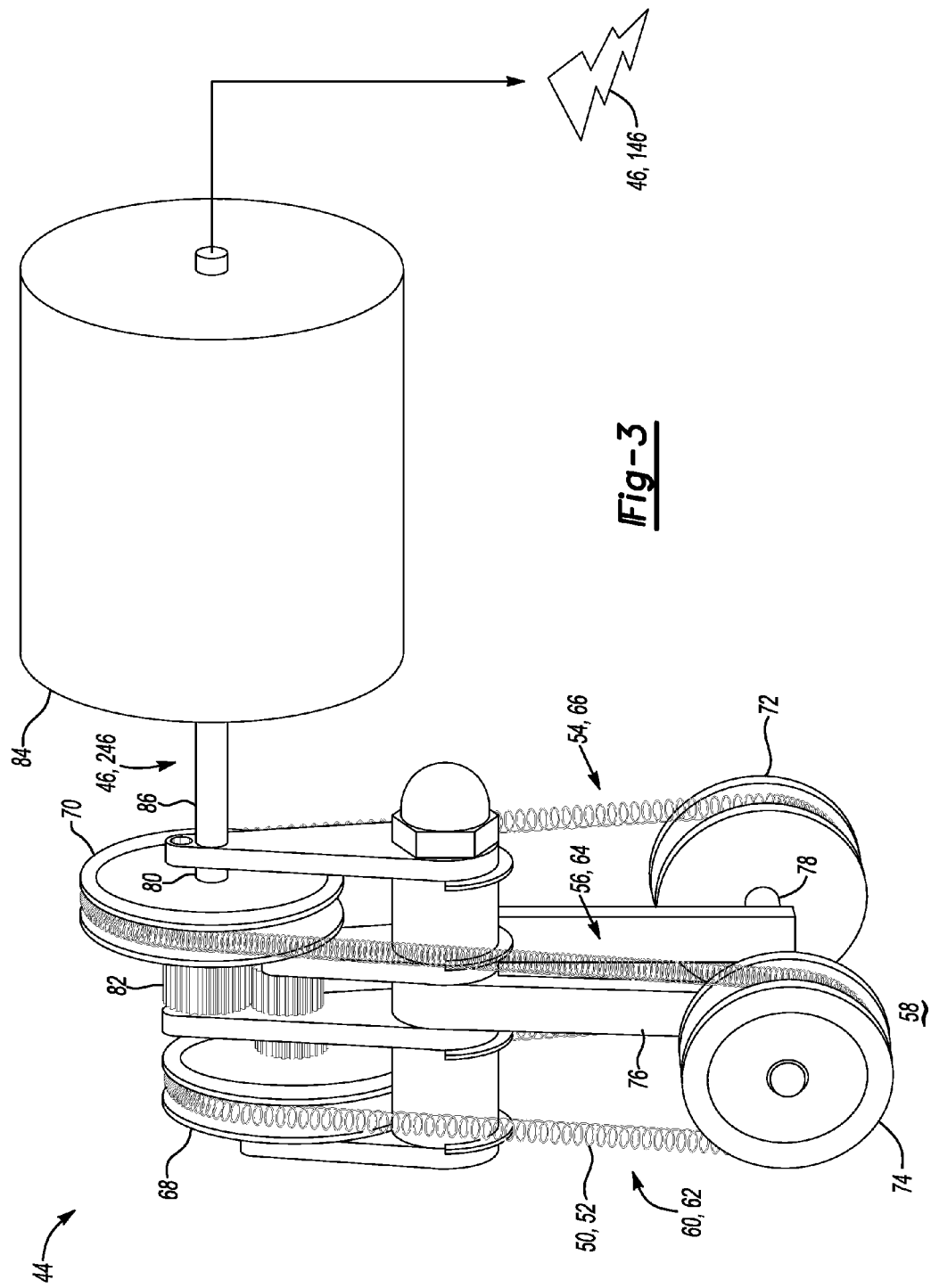
FIG. 3 is a schematic illustration of a perspective view of one embodiment of the heat engine of FIG. 1.

As shown in FIGS. 1-3, the heat engine system 10 also includes a heat engine 44 configured for converting thermal energy 30 to another form of energy 46, e.g., electrical energy (represented generally by 146 in FIGS. 1-3) and/or mechanical energy (represented generally by 246 in FIGS. 1 and 3), as set forth in more detail below. That is, the heat engine 44 may be disposed relative to the collector 42 so that the heat engine 44 may react to the first temperature 38 (FIG. 1). Therefore, heat, e.g., from the comparatively warmer air layer 34 (FIG. 1), may be transferred from the collector 42 to the heat engine 44 by radiation and/or convection, as set forth in more detail below. As such, referring to FIG. 1, the heat engine 44 may operate in response to the temperature difference 32 between the first temperature 38 of the air layer 34 and the second temperature 40 of the ambient air 36.

More specifically, as shown in FIGS. 1 and 2, the heat engine system 10 also includes a guide 48 configured for transferring the air layer 34 from the collector 42 to the heat engine 44. For example, the guide 48 may be configured as a channel or conduit that connects the collector 42 and the heat engine 44. As such, the air layer 34 may be transferred via, for example, conduction and/or radiation, from the collector 42 to the heat engine 44. The guide 48 and the heat engine 44 may be disposed in any suitable location on the vehicle 12. By way of a non-limiting example, the guide 48 and the heat engine 44 may be disposed within the interior compartment 20 of the vehicle 12.

Referring again to FIG. 1, in one non-limiting embodiment, the heat engine 44 may be a Stirling engine 144 configured for converting thermal energy 30 to mechanical energy 246. That is, the heat engine 44 may be operated by cyclic compression and expansion of both the air layer 34 and the ambient air 36. For example, during operation, the air layer 34 may be collected by the collector 42 and channeled to the heat engine 44 to thereby provide a comparatively warm portion of a working fluid (not shown) for the Stirling engine 144. Additionally, ambient air 36 surrounding the vehicle 12 may be channeled to the heat engine 44 to thereby provide a comparatively cool portion of the working fluid for the Stirling engine 144.

Referring now to FIG. 3, in another non-limiting embodiment, the heat engine 44 may include an element 50 formed from a shape memory alloy 52 that is transitionable between a martensite phase 54 and an austenite phase 56 at a transformation temperature (represented generally by 58) in response to the temperature difference 32 (FIG. 1). That is, the shape memory alloy 52 may transition between a martensite crystallographic phase and an austenite crystallographic phase in response to the temperature difference 32 between the air layer 34 (FIG. 1) and the ambient air 36 (FIG. 1) surrounding the vehicle 12 (FIG. 1).

As used herein, the terminology "shape memory alloy" refers to an alloy that exhibits a shape-memory effect and has the capability to quickly change properties in terms of stiffness, spring rate, and/or form stability. That is, the shape memory alloy 52 may undergo a solid state crystallographic phase change via molecular or crystalline rearrangement to shift between the martensite phase 54, i.e., "martensite", and the austenite phase 56, i.e., "austenite". Stated differently, the shape memory alloy 52 may undergo a displacive transformation rather than a diffusional transformation to shift between the martensite and austenite phases 54, 56. A displacive transformation is defined as a structural change that occurs by the coordinated movement of atoms or groups of atoms relative to neighboring atoms or groups of atoms. In general, the martensite phase 54 refers to the comparatively lower-temperature phase and is often more deformable than the comparatively higher-temperature austenite phase 56.

The temperature at which the shape memory alloy 52 begins to change from the austenite phase 56 to the martensite phase 54 is known as the martensite start temperature, $M_s$. The temperature at which the shape memory alloy 52 completes the change from the austenite phase 56 to the martensite phase 54 is known as the martensite finish temperature, $M_f$, or transformation temperature 58. Similarly, as the shape memory alloy 52 is heated, the temperature at which the shape memory alloy 52 begins to change from the martensite phase 54 to the austenite phase 56 is known as the austenite start temperature, $A_s$. The temperature at which the shape memory alloy 52 completes the change from the martensite phase 54 to the austenite phase 56 is known as the austenite finish temperature, $A_f$, or transformation temperature 58.

Therefore, the shape memory alloy 52 may be characterized by a cold state, i.e., when a temperature of the shape memory alloy 52 is below the martensite finish temperature, $M_f$, or transformation temperature 58 of the shape memory alloy 52. Likewise, the shape memory alloy 52 may also be characterized by a hot state, i.e., when the temperature of the shape memory alloy 52 is above the austenite finish temperature, $A_f$, or transformation temperature 58 of the shape memory alloy 52.

More specifically, with continued reference to FIG. 3, the element 50 may be formed from a pseudoplastically pre-strained shape memory alloy 52 that is transitionable between the martensite phase 54 and the austenite phase 56 at the transformation temperature 58 in response to the temperature difference 32 (FIG. 1). The terminology "pseudoplastically pre-strained" refers to stretching the shape memory alloy 52 of the element 50 while the shape memory alloy 52 is in the martensite phase 54 so that the strain exhibited by the shape memory alloy 52 under loading is not fully recovered when unloaded. That is, upon unloading, the shape memory alloy 52 appears to have plastically deformed, but when heated to the austenite start temperature, $A_s$, the strain can be recovered so that the shape memory alloy 52 returns to the original length observed prior to applying any load to the element 50. Additionally, the shape memory alloy 52 may be stretched before installation in the heat engine 44, such that the nominal length of the shape memory alloy 52 includes that recoverable pseudoplastic strain. Therefore, the shape memory alloy 52 may transition from the martensite phase 54 to the austenite phase 56 to thereby dimensionally contract in response to the first temperature 38 (FIG. 1). Conversely, the shape memory alloy 52 may transition from the austenite phase 56 to the martensite phase 54 to thereby dimensionally expand in response to the second temperature 40 (FIG. 1). Such dimensional contraction and expansion may provide motion for driving the heat engine 44, as set forth in more detail below.

With continued reference to FIGS. 1 and 3, in operation, i.e., when exposed to the temperature difference 32 (FIG. 1) between the air layer 34 (FIG. 1) disposed adjacent the road surface 14 (FIG. 1) and the ambient air 36 (FIG. 1) surrounding the vehicle 12 (FIG. 1), the shape memory alloy 52 (FIG. 3) may change dimension upon transitioning between the martensite phase 54 and the austenite phase 56, i.e., upon changing crystallographic phase, to thereby convert thermal energy 30 (FIG. 1) to mechanical energy 46, 246 (FIG. 3). That is, the shape memory alloy 52 may transition from the martensite phase 54 to the austenite phase 56 and thereby dimensionally contract if pseudoplastically pre-strained so as to convert thermal energy 30 to mechanical energy 246. Conversely, the shape memory alloy 52 may transition from the austenite phase 56 to the martensite phase 54 and thereby dimensionally expand if under tensile stress so as to be ready to convert thermal energy 30 to mechanical energy 246. That is, the shape memory alloy 52 may dimensionally expand when cooled below the martensite start temperature $M_s$.

The shape memory alloy 52 may have any suitable composition. In particular, the shape memory alloy 52 may include in combination an element selected from the group of cobalt, nickel, titanium, indium, manganese, iron, palladium, zinc, copper, silver, gold, cadmium, tin, silicon, platinum, and gallium. For example, suitable shape memory alloys 52 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy 52 can be binary, ternary, or any higher order so long as the shape memory alloy 52 exhibits a shape memory effect, e.g., a change in shape orientation, damping capacity, and the like. A skilled artisan, in accordance with this disclosure, may select the shape memory alloy 52 according to a desired range of temperature difference 32 (FIG. 1), first temperature 38 (FIG. 1), and second temperature 40 (FIG. 1). In one specific example, the shape memory alloy 52 may include nickel and titanium.

Further, as described with continued reference to FIG. 3, the element 50 formed from the shape memory alloy 52 may have any suitable form, i.e., shape. For example, the element 50 may be a shape-changing element. In one non-limiting embodiment, the element 50 may be configured as a resilient member 60 arranged in a continuous loop (shown generally at 62), and may have a first localized region 64 and a second localized region 66 spaced apart from the first localized region 64. That is, for this embodiment, the element 50 may be formed as a continuously-looping spring. The first localized region 64 may be one point, portion, or area of the element 50, and the second localized region 66 may be another point, portion, or area of the element 50. As such, the shape memory alloy 52 may transition from the martensite phase 54 to the austenite phase 56 to thereby dimensionally contract at the first localized region 64 in response to the first temperature 38 (FIG. 1). Conversely, the shape memory alloy 52 may transition from the austenite phase 56 to the martensite phase 54 to thereby dimensionally expand at the second localized region 66 in response to the second temperature 40 (FIG. 1). Further, the shape memory alloy 52 may alternately dimensionally contract at the second localized region 66 in response to the first temperature 38, and dimensionally expand at the second localized region 66 in response to the second temperature 40 to thereby convert thermal energy 30 (FIG. 1) to mechanical energy 246.

With continued reference to FIG. 3, the shape memory alloy 52 may convert thermal energy 30 (FIG. 1) to another form of energy, e.g., mechanical energy 246 or electrical energy 146, via any suitable manner. For example, the element 50 formed from the shape memory alloy 52 may activate a pulley system (shown generally in FIG. 3 and set forth in more detail below). That is, in one non-limiting embodiment, the heat engine system 10 (FIGS. 1 and 2) may further include a plurality of wheels or pulleys 68, 70, 72, 74 configured for supporting the element 50 so that the continuous loop 62 translates along the plurality of pulleys 68, 70, 72, 74 in response to the temperature difference 32 (FIG. 1).

For example, in the non-limiting embodiment shown in FIG. 3, the heat engine 44 may include a frame 76 configured for supporting the plurality of wheels or pulleys 68, 70, 72, 74 disposed on a plurality of axles 78, 80. The wheels or pulleys 68, 70, 72, 74 may rotate with respect to the frame 76, and the element 50 may be supported by, and travel along, the wheels or pulleys 68, 70, 72, 74. Speed of rotation of the wheels or pulleys 68, 70, 72, 74 may optionally be modified by one or more gear sets 82.

Referring again to FIG. 3, the heat engine 44 may further include a generator 84 configured for converting mechanical energy 246 to electrical energy 146. The generator 84 may be any suitable device for converting mechanical energy 246 to electrical energy 146. For example, the generator 84 may be an electrical generator that converts mechanical energy 246 to electrical energy 146 using electromagnetic induction, and may include a rotor (not shown) that rotates with respect to a stator (not shown). Moreover, the generator 84 may include a drive shaft 86 attached to the wheel or pulley 70. As such, the generator 84 may be driven by the heat engine 44. That is, mechanical energy 246 resulting from the conversion of thermal energy 30 (FIG. 1) by the shape memory alloy 52 may drive the generator 84. In particular, the shape memory alloy 52 may alternately dimensionally contract at the first localized region 64 in response to the first temperature 38 (FIG. 1), and dimensionally expand at the second localized region 66 in response to the second temperature 40 (FIG. 1) to thereby convert thermal energy 30 to mechanical energy 246 and drive the generator 84.

Further, as best shown in FIG. 1, the heat engine system 10 may also include a battery 88 configured for storing and discharging the electrical energy 146. Therefore, during operation, the battery 88 may accumulate electrical energy 146 for subsequent use by the vehicle 12.

Therefore, with reference to the heat engine of FIG. 3 and described with respect to the example configuration of the element 50 shown in FIG. 3, in operation, as the wheels or pulleys 68, 70, 72, 74 turn or rotate about the respective axles 78, 80 in response to the dimensionally expanding and contracting shape memory alloy 52, the drive shaft 86 may rotate to drive the generator 84. The generator 84 may then convert mechanical energy 246 to electrical energy 146, i.e., may generate electrical energy 146 or electricity.

More specifically, referring again to FIG. 3, one wheel or pulley 74 may be at least sufficiently immersed in the air layer 34 (FIG. 1) while another wheel or pulley 72 is at least sufficiently immersed in the ambient air 36 (FIG. 1). As the first localized region 64 of the shape memory alloy 52 dimensionally expands if under tensile stress when in heat exchange relationship with the ambient air 36, e.g., when sufficiently immersed in the ambient air 36, the second localized region 66 of the shape memory alloy 52 in heat exchange relationship with the air layer 34, e.g., when sufficiently immersed in the air layer 34, dimensionally contracts if pseudoplastically pre-strained. Alternating dimensional contraction and expansion of the continuous spring loop 62 form of the element 50 including the shape memory alloy 52 upon exposure to the temperature difference 32 (FIG. 1) between the air layer 34 and the ambient air 36 may convert potential mechanical energy to kinetic mechanical energy, and thereby convert thermal energy 30 to mechanical energy 246. Therefore, for optimal efficiency of the heat engine system 10, the air layer 34 and the ambient air 36 are preferably rapidly refreshed to maintain the temperature difference 32.

Therefore, as shown generally in FIG. 1, the heat engine 44, and more specifically, the shape memory alloy 52 (FIG. 3) of the heat engine 44, may be disposed in heat exchange relationship with each of the air layer 34 and the ambient air 36. That is, the shape memory alloy 52 may be disposed relative to each of the air layer 34 and the ambient air 36 so as to react to the first temperature 38 and/or the second temperature 40. For example, the shape memory alloy 52 of the heat engine 44 may be disposed in contact with the air layer 34 and the ambient air 36. That is, the air layer 34 may enter the collector 42, conduct through the guide 48, and contact the first localized region 64 (FIG. 3) of the element 50. Similarly, the ambient air 36 may be channeled towards the heat engine 44, e.g., by one or more conduits (not shown), intake channels (not shown), and/or shutters (not shown), and contact the second localized region 66 (FIG. 3) of the element 50. Therefore, the shape memory alloy 52 may transition between the austenite phase 54 and the martensite phase 56 when in heat exchange relationship with the air layer 34 and ambient air 36. For example, when in heat exchange relationship with the air layer 34, which has a higher first temperature 38 than the second temperature 40 of the ambient air 36, the shape memory alloy 52 may transition from the martensite phase 54 to the austenite phase 56. Likewise, when in heat exchange relationship with the ambient air 36, the shape memory alloy 52 may transition from the austenite phase 56 to the martensite phase 54.

The heat engine 44 may further include a housing (shown generally at 90 in FIGS. 1 and 2). The air layer 34 and the ambient air 36 may pass through the housing 90, but may remain separated within the housing 90. For example, the air layer 34 transmitted to the heat engine 44 by the guide 48 from the collector 42 may be separated from the ambient air 36 by a seal or barrier.

Alternatively, the air layer 34 and the ambient air 36 may not pass through the housing 90. That is, a portion of the frame 76 (FIG. 3) of the heat engine 44 may extend from the housing 90. That is, one wheel or pulley 68 (FIG. 1) may be immersed in the air layer 34 collected by the collector 42 while another wheel or pulley 72 (FIG. 1) may be immersed in the ambient air 36 external to the housing 90. In this configuration, portions of the shape memory alloy 52 may therefore protrude from a section of the housing 90 sealed with respect to the air layer 34 and ambient air 36.

Therefore, with continued reference to FIG. 1, for any condition wherein the temperature difference 32 exists between the first temperature 38 of the air layer 34 and the second temperature 40 of the ambient air 36 surrounding the vehicle 12, i.e., wherein the air layer 34 and the ambient air 36 are not in thermal equilibrium, the shape memory alloy 52 (FIG. 3) may dimensionally expand and contract upon transitioning between the martensite phase 54 (FIG. 3) and the austenite phase 56 (FIG. 3). Further, the change in crystallographic phase of the shape memory alloy 52 is sufficient to drive the generator 84 (FIG. 3).

The shape memory alloy 52 may have a small energy hysteresis, and may be responsive to minimal temperature differences 32. Consequently, the heat engine system 10 including the shape memory alloy 52 can produce excellent output, e.g., mechanical energy 246 (FIG. 1) and/or electrical energy 146 (FIG. 2). Stated differently, the heat engine system 10 has excellent efficiency and converts a maximum amount of thermal energy 30 to mechanical energy 246 and/or electrical energy 146, even at a temperature difference 32 of less than or equal to about 10° C., for example. As the temperature difference 32 increases, the heat engine 44 may respond more energetically. That is, for comparatively larger temperature differences 32, the heat engine 44 may convert thermal energy 30 in a shorter amount of time to produce a comparatively larger amount of mechanical energy 246 and/or electrical energy 146.

Referring now to FIG. 2, in another non-limiting embodiment, the heat engine 44 may be a thermoelectric generator 244 configured for converting thermal energy 30 directly to electrical energy 146 (FIG. 1). That is, in this embodiment, the heat engine 44 may not convert thermal energy 30 to mechanical energy 246 (FIG. 1) and then convert mechanical energy 246 to electrical energy 146, but may rather convert thermal energy 30 directly to electrical energy 146. For example, the heat engine 44 may include Peltier elements formed from semiconductors and/or thermoelectrical elements, and may use the Seebeck effect to convert the temperature difference 32 between the first temperature 38 and the second temperature 40 directly to electrical energy 146. The resulting electrical energy 146 may be stored by the battery 88 and/or used immediately by the vehicle 12, e.g., to power on-board electrical systems (not shown).

Figure 4A:
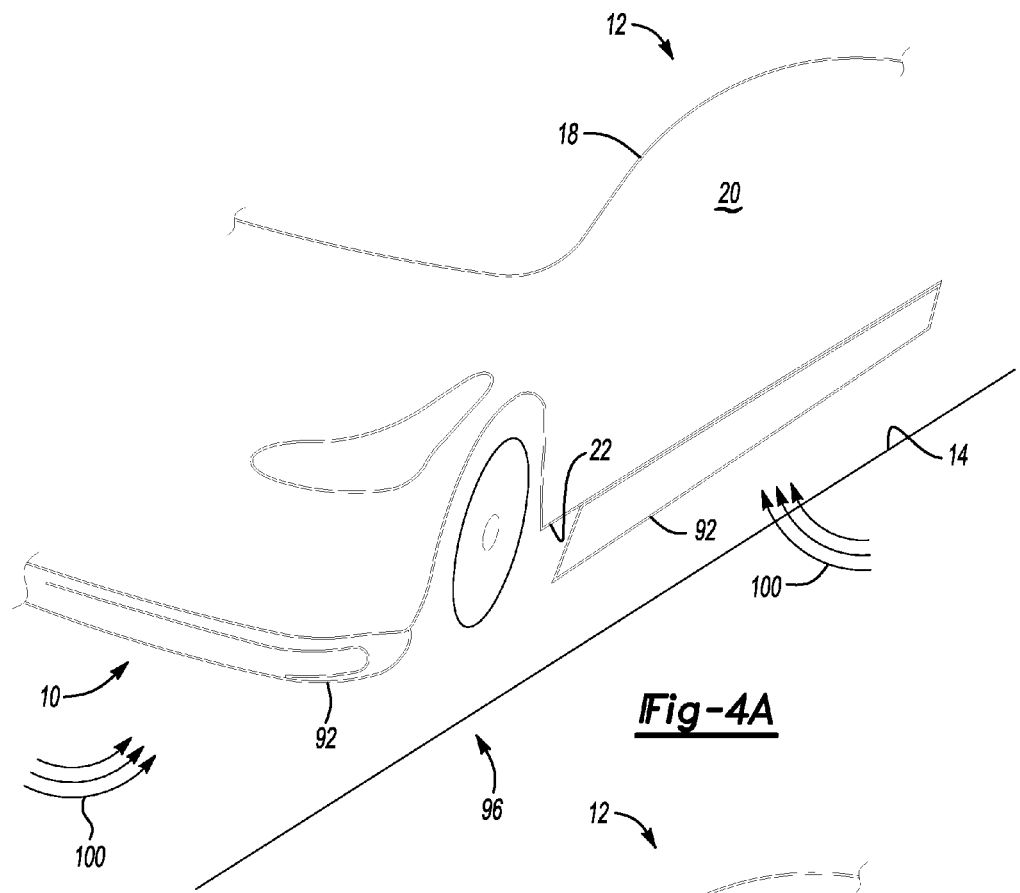
FIG. 4A is a schematic illustration of a perspective, fragmentary view of the vehicle of FIGS. 1 and 2, wherein the heat engine system includes a spoiler disposed in a deployed position.
Figure 4B:
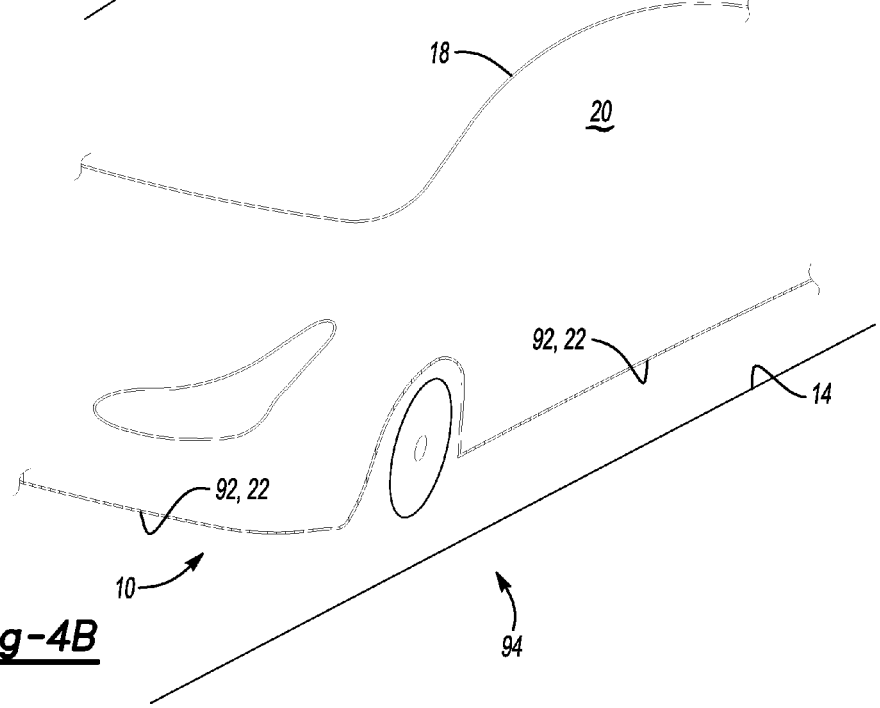
FIG. 4B is a schematic illustration of a perspective, fragmentary view of the vehicle of FIG. 4A, wherein the spoiler is disposed in a refracted position.

Referring now to FIGS. 4A and 4B, the heat engine system 10 may further include a spoiler 92 configured for transitioning between a retracted position 94 (FIG. 4B) wherein the spoiler 92 is disposed substantially flush with the underside surface 22, and a deployed position 96 (FIG. 4A) wherein the spoiler 92 extends from the underside surface 22 to thereby deflect debris 98 (FIG. 1) from the collector 42. In particular, the spoiler 92 may be reversibly deployable from the underside surface 22 of the vehicle 12 so as to transition between the deployed and retracted positions 96, 94, as set forth in more detail below.

With continued reference to FIGS. 4A and 4B, in operation, when the spoiler 92 is disposed in the deployed position 96 (FIG. 4A), the spoiler 92 may surround the road surface 14 spaced opposite the underside surface 22 of the vehicle 12 to thereby minimize airflow 100 along the road surface 14. That is, the spoiler 92 may disrupt airflow 100 along the underside surface 22 of the vehicle 12 by shielding or enveloping the underside surface 22. As such, the spoiler 92 may reduce airflow 100 under the vehicle 12 during vehicle travel, or while the vehicle 12 is parked, so that the road surface 14 does not cool down undesirably. For example, the spoiler 92 may shield the portion of the road surface 14 disposed underneath the vehicle 12 adjacent the collector 42 during windy conditions so as to optimize and maintain the temperature difference 32 (FIG. 1) between the first temperature 38 (FIG. 1) and the second temperature 40 (FIG. 1).

In addition, as described with continued reference to FIGS. 1 and 2, the heat engine system 10 may include a sensor system 102 configured for detecting debris 98 (FIG. 1) present on the road surface 14 and transitioning the spoiler 92 (FIGS. 4A and 4B) to the retracted position 94 (FIG. 4B) to thereby minimize contact between the debris 98 and the spoiler 92. That is, the sensor system 102 may sense the debris 98, e.g., a large object such as a rock, and subsequently retract the spoiler 92 so as to prevent a collision between the debris 98 and the spoiler 92. The sensor system 102 may include, by way of non-limiting examples, one or more ultrasonic sensors (not shown), infrared sensors (not shown), radar sensors (not shown), lidar, i.e., light detection and ranging, sensors (not shown), camera sensors (not shown), and combinations thereof.

Therefore, the aforementioned heat engine system 10 (FIGS. 1, 2, 4A, and 4B) and vehicle 12 (FIGS. 1, 2, 4A, and 4B) are capable of harvesting thermal energy 30 (FIGS. 1 and 2) from a comparatively hot road surface 14 (FIGS. 1, 2, 4A, and 4B). Further, the heat engine system 10 may operate autonomously and automatically in response to the temperature difference 32 (FIGS. 1 and 2). In addition, the heat engine system 10 may efficiently convert thermal energy 30 to mechanical energy 246 (FIGS. 1 and 3). That is, the heat engine system 10 may efficiently harvest thermal energy 30 and produce mechanical output.

While the best modes for carrying out the disclosure have been described in detail, those familiar with the art to which this disclosure relates will recognize various alternative designs and embodiments for practicing the disclosure within the scope of the appended claims.

The invention claimed is:

1. A heat engine system for a vehicle, wherein the vehicle is operable on a road surface, the heat engine system comprising:
a collector configured for collecting an air layer disposed adjacent the road surface, wherein the collector is disposed on an underside surface of the vehicle and spaced opposite the road surface;
a heat engine configured for converting thermal energy provided by a temperature difference between the air layer and an ambient air surrounding the vehicle to another form of energy, wherein the air layer has a first temperature and the ambient air has a second temperature that is lower than the first temperature;
a guide configured for transferring the air layer from the collector to the heat engine; and
a spoiler configured for transitioning between a retracted position wherein the spoiler is disposed substantially flush with the underside surface, and a deployed position wherein the spoiler extends from the underside surface to thereby deflect debris from the collector.

2. The heat engine system of claim 1, wherein the heat engine includes an element formed from a shape memory alloy that is transitionable between a martensite phase and an austenite phase at a transformation temperature in response to the temperature difference.

3. The heat engine system of claim 2, wherein the element is configured as a resilient member arranged in a continuous loop, and has a first localized region and a second localized region spaced apart from the first localized region.

4. The heat engine system of claim 3, wherein the shape memory alloy transitions from the martensite phase to the austenite phase to thereby dimensionally contract at the first localized region in response to the first temperature.

5. The heat engine system of claim 4, wherein the shape memory alloy transitions from the austenite phase to the martensite phase to thereby dimensionally expand at the first localized region in response to the second temperature.

6. The heat engine system of claim 3, wherein the shape memory alloy alternately dimensionally contracts at the first localized region in response to the first temperature and dimensionally expands at the second localized region in response to the second temperature to thereby convert thermal energy to mechanical energy.

7. The heat engine system of claim 6, further including a plurality of pulleys configured for supporting the element so that the continuous loop translates along the plurality of pulleys in response to the temperature difference.

8. The heat engine system of claim 2, further including a generator configured for converting mechanical energy to electrical energy, wherein the element has a first localized region and a second localized region spaced apart from the first localized region, and further wherein the shape memory alloy alternately dimensionally contracts at the first localized region in response to the first temperature and dimensionally expands at the second localized region in response to the second temperature to thereby convert thermal energy to mechanical energy and drive the generator.

9. The heat engine system of claim 8, further including a battery configured for storing and discharging the electrical energy.

10. The heat engine system of claim 2, wherein the heat engine is a Stirling engine configured for converting thermal energy to mechanical energy.

11. The heat engine system of claim 1, wherein the heat engine is a thermoelectric generator configured for converting thermal energy directly to electrical energy.

12. The heat engine of claim 1, wherein the spoiler is disposed in the deployed position, and further wherein the spoiler surrounds the road surface spaced opposite the underside surface of the vehicle to thereby minimize airflow along the road surface.

13. The heat engine of claim 1, further including a sensor system configured for detecting debris present on the road surface and transitioning the spoiler to the retracted position to thereby minimize contact between the debris and the spoiler.

14. A heat engine system for a vehicle, wherein the vehicle is operable on a road surface, the heat engine system comprising:
a collector configured for collecting an air layer disposed adjacent the road surface;
a heat engine configured for converting thermal energy provided by a temperature difference between the air layer and an ambient air surrounding the vehicle to mechanical energy, wherein the air layer has a first temperature and the ambient air has a second temperature that is lower than the first temperature;
wherein the heat engine includes an element formed from a shape memory alloy that is transitionable between a martensite phase and an austenite phase at a transformation temperature in response to the temperature difference;

wherein the element is configured as a resilient member arranged in a continuous loop and has a first localized region and a second localized region spaced apart from the first localized region;

wherein the shape memory alloy alternately dimensionally contracts at the first localized region in response to the first temperature and dimensionally expands at the second localized region in response to the second temperature to thereby convert thermal energy to mechanical energy;

a guide configured for transferring the air layer from the collector to the heat engine;

a spoiler reversibly deployable from an underside surface of the vehicle and configured for transitioning between a retracted position wherein the spoiler is disposed substantially flush with the underside surface, and a deployed position wherein the spoiler extends from the underside surface; and a sensor system configured for detecting debris present on the road surface, and transitioning the spoiler to the retracted position to thereby minimize contact between the debris and the spoiler.

15. The heat engine system of claim 14, further including a generator configured for converting mechanical energy to electrical energy, wherein the shape memory alloy alternately dimensionally contracts and dimensionally expands in response to the temperature difference to thereby convert thermal energy to mechanical energy and drive the generator.

16. A vehicle operable on a road surface, the vehicle comprising:
 a body defining an interior compartment and having an underside surface spaced opposite the road surface; and
 a heat engine system including:
  a collector configured for collecting an air layer disposed adjacent the road surface, wherein the collector is disposed on an underside surface of the vehicle and spaced opposite the road surface;
  a heat engine configured for converting thermal energy provided by a temperature difference between the air layer and an ambient air surrounding the vehicle to another form of energy, wherein the air layer has a first temperature and the ambient air has a second temperature that is lower than the first temperature;
  a guide configured for transferring the air layer from the collector to the heat engine; and
  a spoiler configured for transitioning between a retracted position wherein the spoiler is disposed substantially flush with the underside surface, and a deployed position wherein the spoiler extends from the underside surface to thereby deflect debris from the collector.

17. The vehicle of claim 16, wherein the collector is disposed on the underside surface, and further wherein the guide and the heat engine are disposed within the interior compartment.

18. The vehicle of claim 16, wherein the vehicle is disposed in a parked position on the road surface such that the vehicle is stationary on the road surface.

\* \* \* \* \*